(12) United States Patent
Winkler

(10) Patent No.: US 7,063,351 B2
(45) Date of Patent: Jun. 20, 2006

(54) AIR-BAG ARRANGEMENT

(75) Inventor: Jochen Winkler, München (DE)

(73) Assignee: Forrester Ketley & Co., London (GB)

( * ) Notice: Subject to any disclaimer, the term of this patent is extended or adjusted under 35 U.S.C. 154(b) by 0 days.

(21) Appl. No.: 10/433,733

(22) PCT Filed: Nov. 7, 2001

(86) PCT No.: PCT/SE01/02443

§ 371 (c)(1),
(2), (4) Date: Oct. 7, 2003

(87) PCT Pub. No.: WO02/46004

PCT Pub. Date: Jun. 13, 2002

(65) Prior Publication Data

US 2004/0041376 A1    Mar. 4, 2004

(30) Foreign Application Priority Data

Dec. 8, 2000    (GB) .................. 0030053.3

(51) Int. Cl.
*B60R 21/22* (2006.01)
(52) U.S. Cl. .................. 280/730.2; 280/749
(58) Field of Classification Search ............. 280/729, 280/730.2, 743.2, 743.1, 749, 730.1
See application file for complete search history.

(56) References Cited

U.S. PATENT DOCUMENTS

| | | | |
|---|---|---|---|
| 5,899,491 A | | 5/1999 | Tschaeschke |
| 6,095,551 A * | | 8/2000 | O'Docherty ............. 280/730.2 |
| 6,241,277 B1 * | | 6/2001 | Heigl et al. ............ 280/730.2 |
| 6,273,458 B1 * | | 8/2001 | Steffens et al. .......... 280/730.2 |
| 6,367,836 B1 * | | 4/2002 | Tanase et al. ............ 280/730.2 |
| 6,454,296 B1 * | | 9/2002 | Tesch et al. ............. 280/730.2 |
| 6,464,250 B1 * | | 10/2002 | Faigle et al. ............ 280/730.2 |
| 6,505,853 B1 * | | 1/2003 | Brannon et al. ......... 280/730.2 |
| 6,527,296 B1 * | | 3/2003 | Bakhsh et al. ........... 280/730.2 |
| 6,557,892 B1 * | | 5/2003 | Herzog .................... 280/743.2 |
| 6,709,008 B1 * | | 3/2004 | McGee et al. ............. 280/729 |
| 6,709,010 B1 * | | 3/2004 | Dominissini et al. .... 280/730.2 |

FOREIGN PATENT DOCUMENTS

| | | |
|---|---|---|
| DE | 196 11 575 | 9/1997 |
| EP | 0 814 001 | 12/1997 |
| EP | 0 924 122 | 6/1999 |
| EP | 0 978 421 | 2/2000 |
| GB | 2 297 950 | 8/1996 |
| GB | 2 327 066 A | 1/1999 |
| WO | WO-98 26959 | 6/1998 |
| WO | WO-99 19174 | 4/1999 |
| WO | WO-99 51466 | 10/1999 |

* cited by examiner

Primary Examiner—Paul N. Dickson
Assistant Examiner—Toan C. To
(74) Attorney, Agent, or Firm—Madson & Austin

(57) ABSTRACT

An airbag arrangement comprises an inflatable element having one edge thereof secured to part of the roof of a vehicle by at least one anchoring point, the inflatable element being adapted, on inflation to be located between an occupant of the vehicle and the side of the vehicle. The inflatable element is configured so that a dimension of the inflatable element reduces on inflation of the inflatable element, the inflatable element being associated with a strap extending from the element though a second anchoring point, the strap comprising a strap adjustably connected to the inflatable element at two points which are spaced apart when the airbag is inflated.

6 Claims, 1 Drawing Sheet

AIR-BAG ARRANGEMENT

BACKGROUND OF THE INVENTION

1. Field of the Invention

THE PRESENT INVENTION relates to an air-bag arrangement, and more particularly relates to an air-bag arrangement for use in a motor vehicle such as a motor car.

2. Description of Related Art

It has been proposed to provide an air-bag arrangement in the form of a so-called inflatable curtain, to provide protection for an occupant of a motor vehicle in the event that an accident such as a side impact, or a roll-over situation should occur. Air-bags of this type are described in many prior Specifications including GB 2,297,950A.

The air-bags or inflatable elements which form the so-called inflatable curtains are typically formed to have two adjacent layers of fabric, with selected regions of the fabric layer being interconnected, or even inter-woven using a one-piece weaving technique, so that the air-bag presents a plurality of separate inflatable zones, regions, chambers or cells.

This particular construction for an inflatable curtain is preferred, because the inflatable curtain is normally initially stored in a housing or recess which extends over the door openings of the motor vehicle, and which is therefore not straight, but curved. It is desirable for the air-bag, when inflated, to become tensioned, since otherwise if the head of an occupant strikes the air-bag, when it is located adjacent a window, the force applied to the air-bag by the head of the occupant may cause the window to break, and the air-bag may then pass through the broken window permitting the head of the occupant to move to a position on the exterior of the vehicle.

Consequently, in the prior proposed arrangements, the air-bag has had an upper edge secured to part of the vehicle located above the door opening, and at least one strap extending from the lower edge to an anchoring point provided, for example, on the "A"-Post or on the "C"-Post of the vehicle. In some cases there is no strap, but the lower edge of the inflatable element is itself secured to the anchoring point.

The use of a strap is preferred, since it does facilitate the initial storage of the inflatable element within the recess or housing. It is to be understood, here, that the opposed ends of a line of tension that is to be created as the air-bag inflates, are always firmly secured to the motor vehicle, and the inflatable element and any straps must be stored in the recess or housing which has a length much greater than the length of the line of tension, because the recess or housing is not straight. Thus, it is important that the effective length of the air-bag (and any associated strap) extending between the two anchoring points which define the opposed ends of the line of tension should reduce as the air-bag is inflated. The effect of the zones, regions, chambers or cells, foiled by the regions of fabric which are secured together, provides the effect of reducing the length of the relevant part of the air-bag.

SUMMARY OF THE INVENTION

The present invention seek, to provide an improved air-bag arrangement.

According to this invention there is provided an air-bag arrangement comprising an inflatable element having one edge thereof secured to part of the roof of a vehicle by at least one anchoring point, the inflatable element being adapted, on inflation, to be located between an occupant of the vehicle and the side of the vehicle, the inflatable element being configured so that a dimension of the inflatable element reduces on inflation of the inflatable element, the inflatable element being associated with a strap extending from the inflatable element to a second anchoring point, the strap comprising a strap adjustably connected to the inflatable element at two points which are spaced-apart when the air-bag is inflated.

Preferably the strap is in the form of a loop, part of the loop being connected to an anchoring point provided on the vehicle, and two parts of the loop passing slidably through means which connect the loop to the air-bag.

Conveniently the air-bag is mounted in a motor vehicle with the air-bag itself initially being stored above a door opening in the vehicle, and with the anchoring point for the strap being on the "A"-Post of the vehicle.

Advantageously an inflation of the inflatable element, at least one line of tension is created by the strap and the inflatable element between the two anchoring points.

Preferably two lines of tension are created.

DETAILED DESCRIPTION OF THE INVENTION

Figure 1:
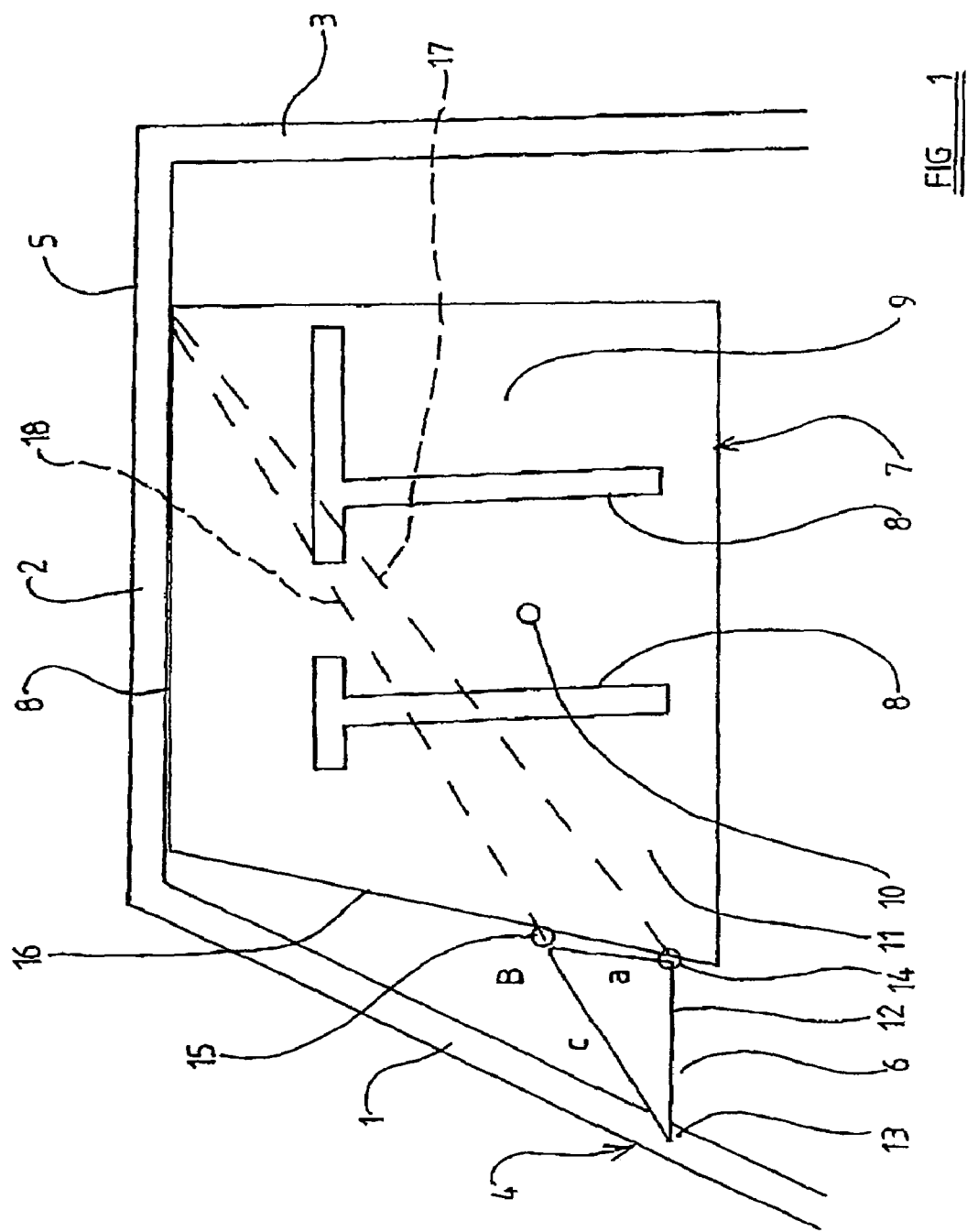
FIG. 1 is a schematic view of an inflatable curtain according to the present invention having a strap adjustably connected to the inflatable curtain at two points and to a vehicle at one point to have a triangular configuration.

In order that the invention may be more readily understood, and so that further features thereof may be appreciated, the invention will now be described, by way of example, with reference to the accompanying drawing which is a diagrammatic representation of an air-bag in accordance with the invention when inflated.

Referring to the accompanying drawing, which is a diagrammatic and schematic illustration, part of a motor vehicle is illustrated. The illustrated part of a motor vehicle includes the tipper part of an "A"-Post 1, part of a roof 2 extending above a door opening, and a "B"-Post 3 located adjacent the door opening. A recess or housing is provided in the "A"-Post 1 and the roof 2, extending from a first point 4 to a second point 5. The first point 4 constitutes an anchorage for a strap 6 which will be described hereinafter in greater detail, and the point 5 constitutes an anchorage for an inflatable element or air-bag 7.

The inflatable element or air-bag 7 is shown schematically, but is an inflatable element or air-bag which has its upper edge 8 secured to the roof 2. The upper edge 8 may be secured to the roof along its entirety or, in a preferred arrangement, will be secured in position by a number of evenly spaced mounting lugs. The inflatable element or air-bag 7 is initially stored, in a folded state, in the recess or housing.

The inflatable element itself is generally of the type described in GB 2,297950A, and consists of adjacent layers of fabric, which can be considered a front layer and a rear layer, with the rear layer being located adjacent a window contained in a door within the door opening, defined by the "A"-Post 1, the roof 2 and the "B"-Post 3, and the front layer being directed towards the interior of the motor vehicle. In selected regions 8', the two layers of fabric are interconnected, either by stitching or by being woven together by use of a one-piece-weaving technique, or in some other convenient way. The regions 8' where the fabric layers are joined together serve to define zones or regions 9, 10, 11 which are free to inflate. It is to be understood that the zones or regions 9, 10, 11, when inflated, will form separate chambers or cells which, in the described embodiment, will be substantially cylindrical and substantially vertical. However, many alternative form of inflatable zone may be utilised to provide the desired effect.

The strap 6 is in the form of a loop 12 of webbing, having one part 13 secured to the anchoring point 4, and having other parts slidably passing through loops 14, 15 secured to the side edge 16 of the inflatable element which is adjacent the "A"-Post 1. The loops 14 and 15 are secured to parts of the inflatable element 7 that are spaced-apart when the inflatable element is inflated.

It is to be understood that in the initial or folded condition of the air-bag, when the air-bag 7 is present in the recess or housing that extends between the points 4 and 5, tie two loops 14 and 15 may be located physically very close to each other, meaning that the effective length of the strap 6 will be one-half of the sum of the length of the sides of the triangle constituted by the strap 6 when the air-bag 7 is in the inflated state as shown in the accompanying drawing. This will help ensure that the air-bag and the strap 6 may be folded into the recess or housing, even though the recess or housing is not straight, so that the length of the recess or housing is greater than the direct linear distance between the anchoring points 4 and 5.

On deployment of the air-bag 7, by means of a conventional gas generator activated in response to a signal from a conventional side impact, or roll-over sensor, the two loops 14 and 15 will be moved to spaced-apart positions, as shown in FIG. 1, causing the webbing strap constituting the belt 6 to adopt a triangular configuration. The effective length of the belt 6 is thus reduced, which will aid the tensioning effect provided by the inflation of the cells or chambers 9, 10 and 11.

It is to be understood, however, that in the described embodiment of the invention, two separate lines of tension will be created extending across the air-bag 7, one line of tension 17 extending from the loop 14 to the anchoring point 5, and the other line of tension 18 extending from the loop 15 to the anchoring point 5. The presence of two slightly spaced-apart lines of tension will, it is believed, enhance the stability of the air-bag 7, further reducing the risk of the air-bag being forced out through the window of the motor vehicle as a consequence of the head of an occupant of the vehicle striking the air-bag In the present specification "comprise" means "includes or consists of" and "comprising" means "including or consisting of".

The invention claimed is:

1. An air-bag arrangement comprising an inflatable element having one edge thereof securable to part of a roof of a vehicle by at least one anchor point, the inflatable element being adapted, on inflation, to be located between an occupant of the vehicle and a side of the vehicle, the inflatable element being configured so that a dimension of the inflatable element reduces on inflation of the inflatable element, the inflatable element being associated with a strap extendable from the inflatable element to a second anchoring point, the strap adjustably connected to the inflatable element at two points which are spaced-apart when the air-bag is inflated, wherein the strap is in the form of a closed loop, part of the loop connectable to the second anchoring point provided on the vehicle, and two parts of the loop passing slidably through means which connect the loop to the air-bag.

2. An arrangement according to claim 1 wherein the strap is in the form of a loop, part of the loop connectable to the second anchoring point provided on the vehicle, and two parts of the loop passing slidably through means which connect the loop to the air-bag.

3. An arrangement according to claim 2 wherein the air-bag is mounted in a motor vehicle with the air-bag itself initially being stored above a door opening in the vehicle, and with the anchoring point for the strap being on the "A"-Post of the vehicle.

4. An arrangement according to claim 1 wherein, on inflation of the inflatable element, at least one line of tension is created by the strap and the inflatable element between two anchoring points.

5. An arrangement according to claim 4 wherein two lines of tension are created.

6. An arrangement according to claim 1, wherein the strap is in the form of a first loop, a first part of the first loop connectable to an anchoring point provided on the vehicle, and a second and third part of the first loop passing slidably through second and third loops on the inflatable element, thereby connecting the strap to the inflatable element.

* * * * *

UNITED STATES PATENT AND TRADEMARK OFFICE
CERTIFICATE OF CORRECTION

| | |
|---|---|
| PATENT NO. | : 7,063,351 B2 |
| APPLICATION NO. | : 10/433733 |
| DATED | : June 20, 2006 |
| INVENTOR(S) | : Jochen Winkler |

It is certified that error appears in the above-identified patent and that said Letters Patent is hereby corrected as shown below:

On The Title Page: Item (73)
Please change the Assignee from "Forrester Ketley & Co., London (GB)" to
-- Autoliv Development AB, Vargarda, Sweden--

Signed and Sealed this

Eighth Day of May, 2007

JON W. DUDAS
*Director of the United States Patent and Trademark Office*